United States Patent
Xu

(10) Patent No.: US 9,366,905 B2
(45) Date of Patent: Jun. 14, 2016

(54) LIQUID CRYSTAL PANEL AND MANUFACTURING METHOD FOR THE SAME

(75) Inventor: Liang Xu, Shenzhen (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 37 days.

(21) Appl. No.: 13/380,895

(22) PCT Filed: Dec. 6, 2011

(86) PCT No.: PCT/CN2011/083528
§ 371 (c)(1),
(2), (4) Date: Dec. 26, 2011

(87) PCT Pub. No.: WO2013/082755
PCT Pub. Date: Jun. 13, 2013

(65) Prior Publication Data
US 2013/0141684 A1 Jun. 6, 2013

(30) Foreign Application Priority Data
Dec. 5, 2011 (CN) .......................... 2011 1 0398043

(51) Int. Cl.
*G02F 1/1337* (2006.01)
*G02F 1/1343* (2006.01)
*G02F 1/137* (2006.01)

(52) U.S. Cl.
CPC ...... *G02F 1/133707* (2013.01); *G02F 1/13439* (2013.01); *G02F 2001/13712* (2013.01); *G02F 2001/133742* (2013.01); *G02F 2201/123* (2013.01)

(58) Field of Classification Search
CPC .................... G02F 1/133707; G02F 1/134309; G02F 1/13439; G02F 2001/13629; G02F 2201/128; G02F 1/155; G02F 1/1343; G02F 2001/133742; G02F 2001/13712; G02F 2201/123; G02F 1/1337; G02F 2001/133776; G02F 2001/133792; G02F 2001/133769; H01L 21/3213; H01L 21/3219; H01L 21/32134; H01L 21/32139; Y10T 428/31678
USPC ............ 349/139, 147, 123, 125, 132; 216/17, 216/41, 56, 83, 96, 100, 108, 13; 438/42, 438/43, 689, 720, 722, 30, 700; 257/E21.018, E21.02, E21.476, 257/E21.483, E21.485, E21.486; 445/24; 428/411.1, 457
See application file for complete search history.

(56) References Cited

U.S. PATENT DOCUMENTS

| | | | | |
|---|---|---|---|---|
| 5,491,347 A | * | 2/1996 | Allen | .................... G09G 3/3648 257/59 |
| 6,798,464 B2 | * | 9/2004 | Bietsch | ............. G02F 1/133621 349/12 |
| 7,128,631 B2 | * | 10/2006 | McCoy | .................. B82Y 30/00 430/198 |

(Continued)

*Primary Examiner* — Paisley L Arendt
*Assistant Examiner* — Angela Davison

(57) ABSTRACT

The invention relates to a liquid crystal substrate and a manufacturing method for the same. The liquid crystal substrate includes a substrate, a transparent electrode layer formed on the substrate. Slits are formed in the transparent electrode layer, and the transparent electrode layer is also provided below the slits. In the liquid crystal substrate and the manufacturing method thereof, the transparent electrode layer is also provided under the slits, thereby an electric field intensity at the slits is enhanced when a voltage is applied, and further increase a transmittance of a liquid crystal display panel.

11 Claims, 11 Drawing Sheets

(56) References Cited

U.S. PATENT DOCUMENTS

| | | | |
|---|---|---|---|
| 2006/0055852 A1* | 3/2006 | Yoshida et al. | 349/114 |
| 2006/0197884 A1* | 9/2006 | Kim | H01L 27/307 349/43 |
| 2008/0239223 A1* | 10/2008 | Fujita | 349/138 |
| 2008/0259265 A1* | 10/2008 | Ono et al. | 349/147 |
| 2009/0310076 A1* | 12/2009 | Hsieh | G02F 1/134309 349/144 |
| 2011/0058133 A1* | 3/2011 | Ishigaki | G02F 1/136227 349/138 |
| 2011/0157537 A1* | 6/2011 | Chen | G02F 1/133707 349/158 |
| 2011/0205478 A1* | 8/2011 | Nakahara et al. | 349/139 |

* cited by examiner

LIQUID CRYSTAL PANEL AND MANUFACTURING METHOD FOR THE SAME

TECHNICAL FIELD OF THE INVENTION

The present invention involves a field of manufacture of liquid crystal display (LCD) panels, more particularly, involves a vertical alignment display mode LCD panel and a manufacturing method for the same.

BACKGROUND OF THE INVENTION

LCD panels have been gradually become the mainstream flat display apparatus due to the advantages of light weight, small size and low power consumption.

A vertical alignment (VA) display mode technique has been widely used in the field of liquid crystal display due to a good performance in a wide viewing angle. The VA display modes include a multi-domain vertical alignment (MVA) mode, a patterned vertical alignment (PVA) mode, a polymer sustained vertical alignment (PSVA) mode and so on.

The vertical alignment display mode called the PSVA mode is shown in FIG. 1A, FIG. 1B and FIG. 1C. FIG 1A is a schematic diagram showing a structure of a first transparent electrode layer of a LCD panel of a current PSVA mode; FIG. 1B is a schematic diagram showing a structure taken along an A-A' section of the PSVA mode LCD panel in FIG. 1A when the panel is not powered; FIG. 1C is a schematic diagram showing a structure taken along an A-A' section of the PSVA mode LCD panel in FIG. 1A when the panel is powered. The LCD panel 100 of this display mode comprises a color filter (CF) substrate 110, a thin film transistor (TFT) substrate 120 and liquid crystal molecules 130. Transparent electrode layers 140 and 141 are provided on inner sides of the CF substrate 110 and the TFT substrate 120. The transparent electrode layer 141 on the TFT substrate 120 has slits 142 formed therein. Reaction monomers are added into the liquid crystal molecules 130. By applying a voltage and irradiating with a UV ray, the reaction monomers react to generate polymer chains 150, thereby making the liquid crystal molecules incline at a predetermined angle, so that a response speed of the liquid crystal molecules 130 is accelerated.

However, the transparent electrode layer 141 on the TFT substrate 120 has the slits 142. An electric field driving force is weaker at a position of the slits 42, resulting in a poor transmittance of the LCD panel 100 at the positions of the slits 142. In order to increase the transmittance of the PSVA mode LCD panel 100, a width of the slit 142 is required to be reduced to overcome the defect that the electric field driving force is weak at the positions of the slits 142. Nevertheless, this is limited by a capability of an exposer. If a predetermined width of the slit 142 is failed to be reached, the electric field intensity at the position of the slit 142 is insufficient, thereby causing the transmittance of the LCD panel 100 is not high.

Therefore, there is a need for an LCD panel and a manufacture method for the same to solve the problem existing in the prior art.

SUMMARY OF THE INVENTION

An objective of the present invention is to provide a liquid crystal substrate for increasing an electric field intensity at a position of a slit in a transparent electrode layer and a manufacture method for the same so as to solve the technical problem that the electric field intensity at the position of the slit of the current PSVA mode LCD panel is insufficient, resulting in a lower luminousness of the LCD panel.

In order to solve the above problem, a technical solution provided by the present invention is as follows:

The present invention relates to a liquid crystal substrate, which comprises a transparent electrode layer having slits formed therein, and the transparent electrode layer is also provided below the slits.

In the liquid crystal substrate of the present invention, the transparent electrode layers include a first transparent electrode layer and a second transparent electrode layer, the second transparent electrode layer has the slits formed therein, and the first transparent electrode layer is disposed below the slits.

In the liquid crystal substrate of the present invention, there is a third insulation layer between the first transparent electrode layer and the second transparent electrode layer.

In the liquid crystal substrate of the present invention, the liquid crystal substrate further comprises a second insulation layer, the first transparent electrode layer is disposed on the second insulation layer, and the third insulation layer covers the second insulation layer and the first transparent electrode layer.

In the liquid crystal substrate of the present invention, the liquid crystal substrate further comprises a second insulation layer, the first transparent electrode layer is disposed on the second insulation layer, and the third insulation layer covers the first transparent electrode layer only.

In the liquid crystal substrate of the present invention, the second transparent electrode layer comprises the same material as the first transparent electrode layer.

In the liquid crystal substrate of the present invention, the second transparent electrode layer is disposed on a surface of the first transparent electrode layer.

In the liquid crystal substrate of the present invention, the second transparent electrode layer comprises a different material from the first transparent electrode layer.

In the liquid crystal substrate of the present invention, the liquid crystal substrate comprises a second insulation layer having a plurality of grooves formed therein, the transparent electrode layer is provided in the grooves and one the second insulation layer, the slits are provided above the grooves.

In the liquid crystal substrate of the present invention, the grooves penetrate the second insulation layer.

In the liquid crystal substrate of the present invention, the liquid crystal substrate further comprises a plurality of data lines and drains, the transparent electrode layer is connected with the drain via a contact hole.

The present invention further relates to a manufacturing method for a liquid crystal substrate, comprising steps of: A. forming transparent electrode layer on substrates; B. forming slits in the transparent electrode layer and making the transparent electrode layer also exist below the slits.

In the manufacturing method for the liquid crystal substrate in accordance with the present invention, the step A particularly comprises forming a first transparent electrode layer and a second transparent electrode layer; the step B particularly comprises forming slits in the second transparent electrode layer.

In the manufacturing method for the liquid crystal substrate in accordance with the present invention, in the step A, the first transparent electrode layer is formed under a condition that a temperature is greater than 100 centigrade degree so as to appear a polycrystal state.

In the manufacturing method for the liquid crystal substrate in accordance with the present invention, in the step B, the second transparent electrode layer is formed under a room temperature to appear an amorphous state.

In the manufacturing method for the liquid crystal substrate in accordance with the present invention, after the step B, the method further comprises a step of: executing an annealing process to the liquid crystal substrate to convert the second transparent electrode layer from the amorphous state into the polycrystal state.

In the manufacturing method for the liquid crystal substrate in accordance with the present invention, in the step B, the slits are formed by etching with an etchant, and the etchant is a weak acid.

In the manufacturing method for the liquid crystal substrate in accordance with the present invention, the step A particularly comprise: forming a first transparent electrode layer, a third insulation layer and a second transparent layer on the substrates.

In the manufacturing method for the liquid crystal substrate in accordance with the present invention, the third insulation layer is only disposed between the first transparent electrode layer and the second transparent electrode layer.

In the manufacturing method for the liquid crystal substrate in accordance with the present invention, the step A particularly comprise: forming a second insulation on the substrate, forming grooves in the second insulation layer, and forming the transparent electrode layer on the second insulation layer and in the grooves.

The liquid crystal substrate and the manufacturing method for the same of the present invention provides a transparent electrode layer under the slits of another transparent electrode layer to increase the electric field intensity at the positions of the slits, and thereby increasing the luminousness of the LCD panel.

For a better understanding of the aforementioned content of the present invention, preferred embodiments are described in detail in conjunction with the appending figures as follows:

DETAILED DESCRIPTION OF THE INVENTION

The respective embodiments will be described with reference to the appending drawings as follows, and they are specific embodiments for exemplifying that the present invention is able to be put into practice.

Figure 1A:
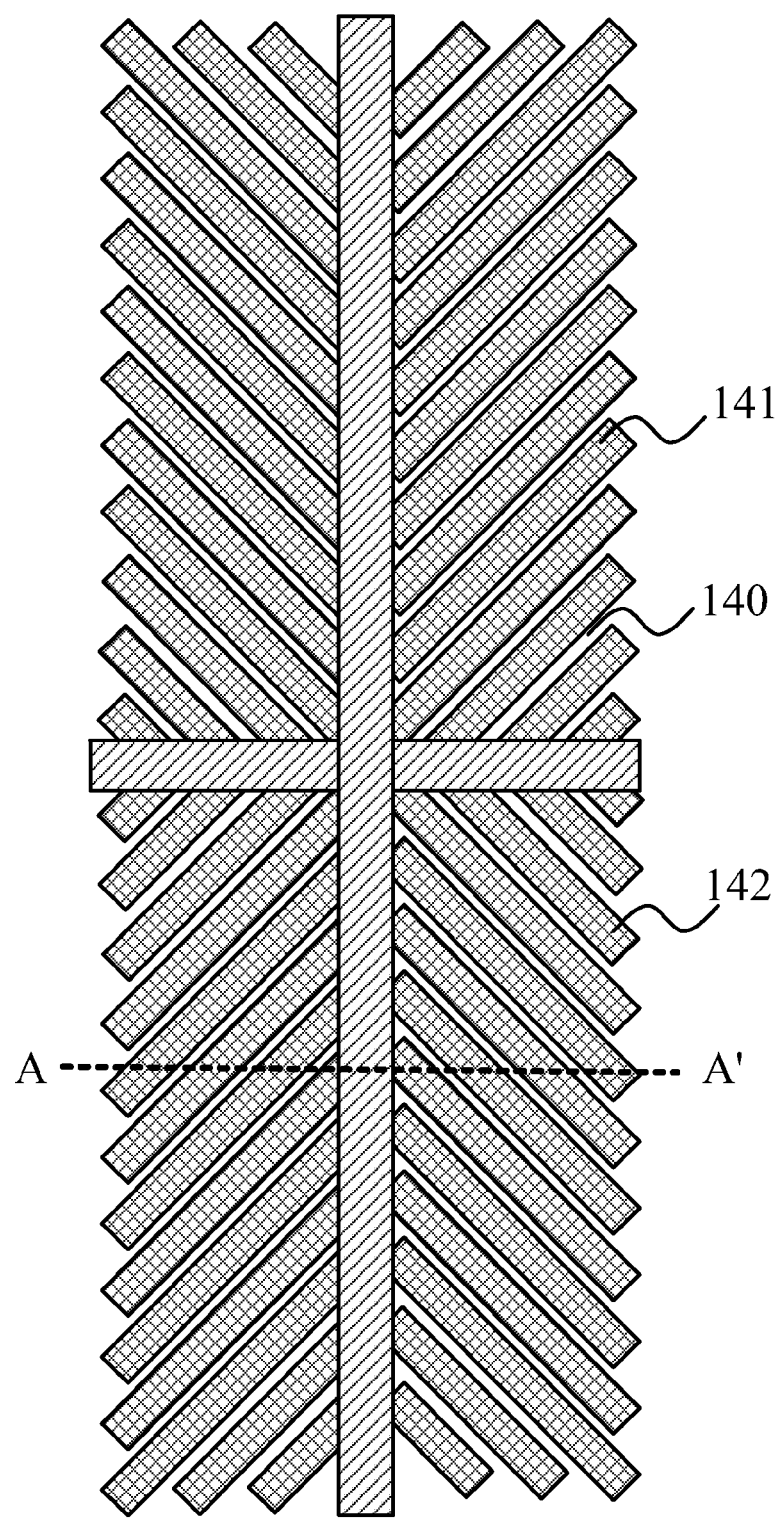
FIG. 1A is a schematic diagram showing a structure of a first transparent electrode layer of a LCD panel of a current PSVA mode.
Figure 1B:
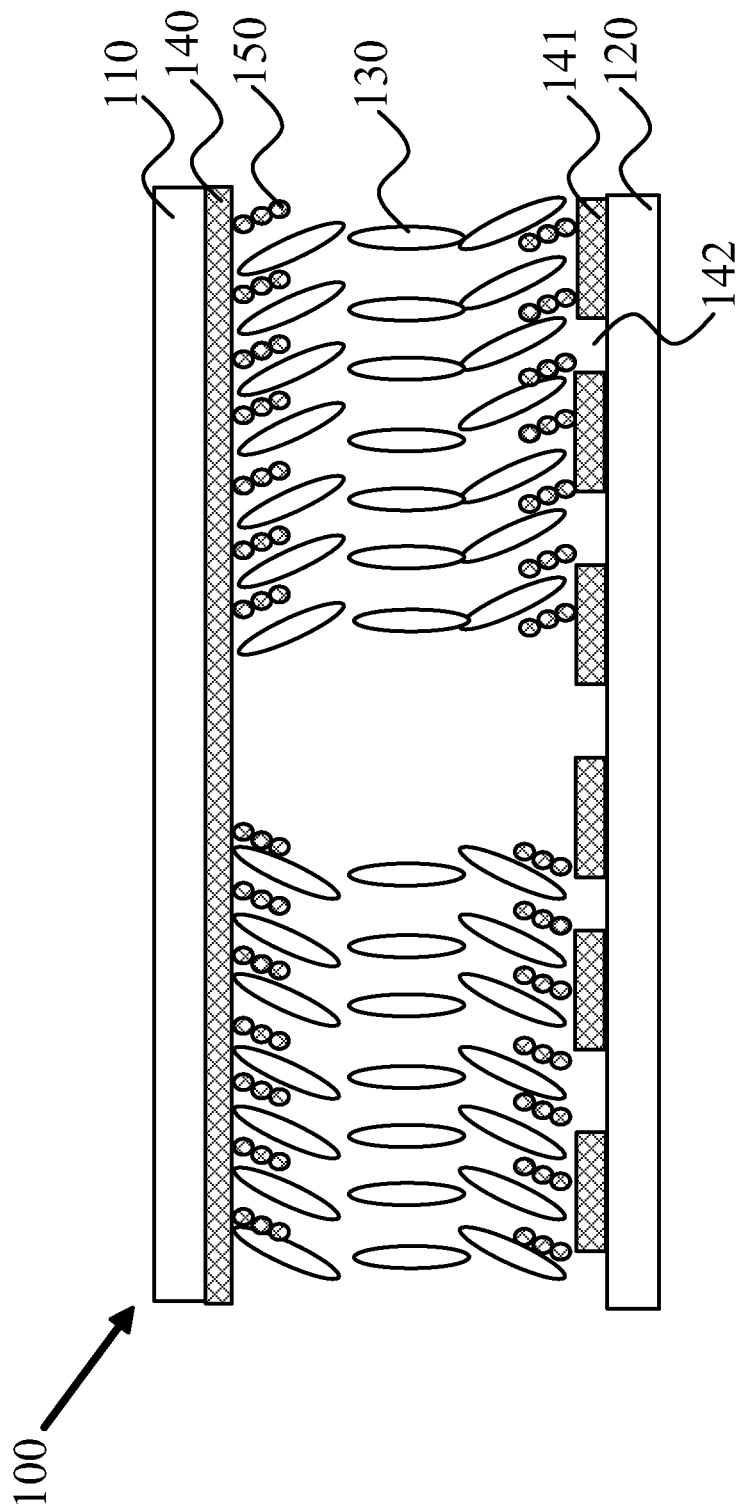
FIG. 1B is a schematic diagram showing a structure taken along an A-A' section of the PSVA mode LCD panel in FIG. 1A when the panel is not powered.
Figure 1C:
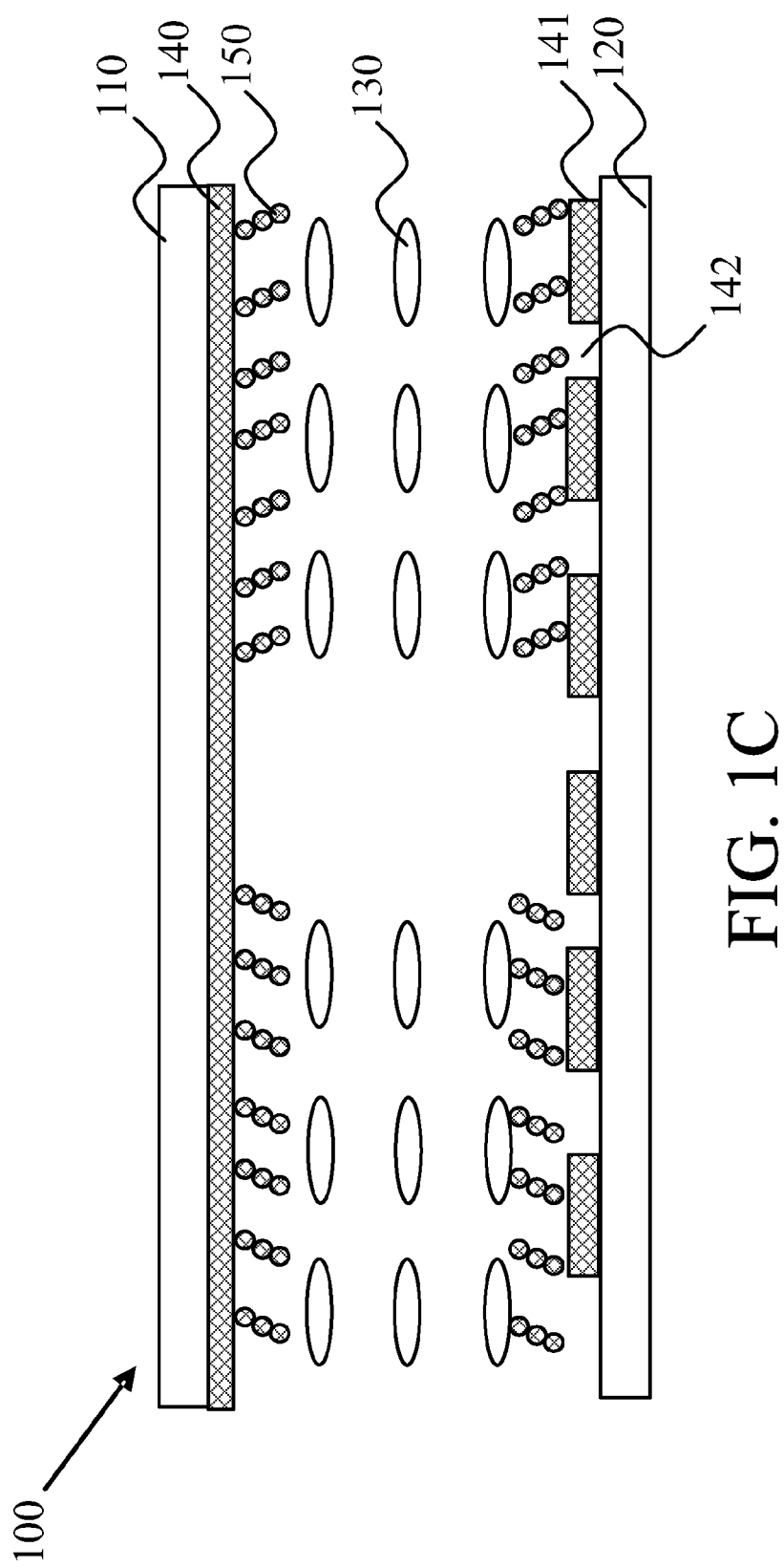
FIG. 1C is a schematic diagram showing a structure taken along an A-A' section of the PSVA mode LCD panel in FIG. 1A when the panel is powered.
Figure 2:
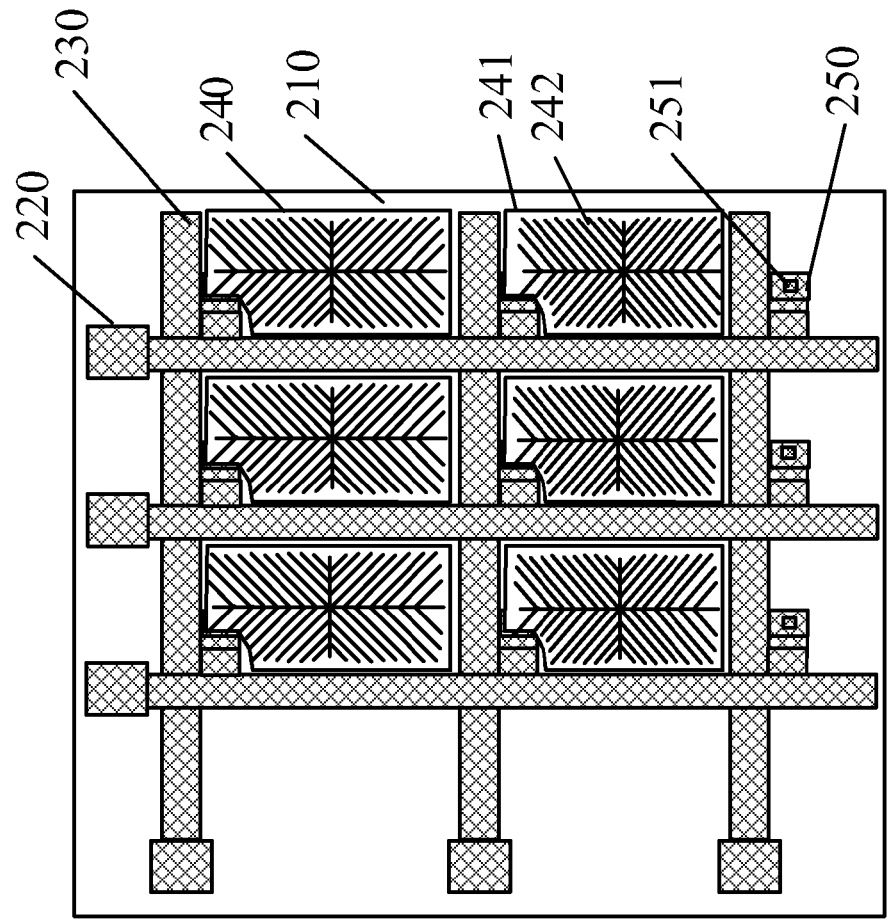
FIG. 2 is a partial top view of a liquid crystal substrate of the present invention.

Please refer to FIG. 2, which is a partial top view of a liquid crystal substrate of the present invention. The liquid crystal substrate 200 comprises a substrate 210, a plurality of data lines 220 disposed in parallel, a plurality of scan lines 230 vertical to the data lines, and a plurality of pixel units 240. The pixel unit 240 is disposed in a rectangle region formed by the data line and the scan line intersecting with each other. A thin film transistor (TFT) 250 is formed at the intersection of the data line 220 and the scan line 230. The pixel unit 240 is electrically connected with the TFT 250 via a contact hole 251. The pixel unit 240 comprises a transparent electrode layer 241 and a plurality of slits 242. Of course, the present invention is described by taking the shape of the above pixel unit 240 as an example, in a practical embodiment, the shape of the pixel unit 240 can be determined according to the actual condition.

Figure 3:
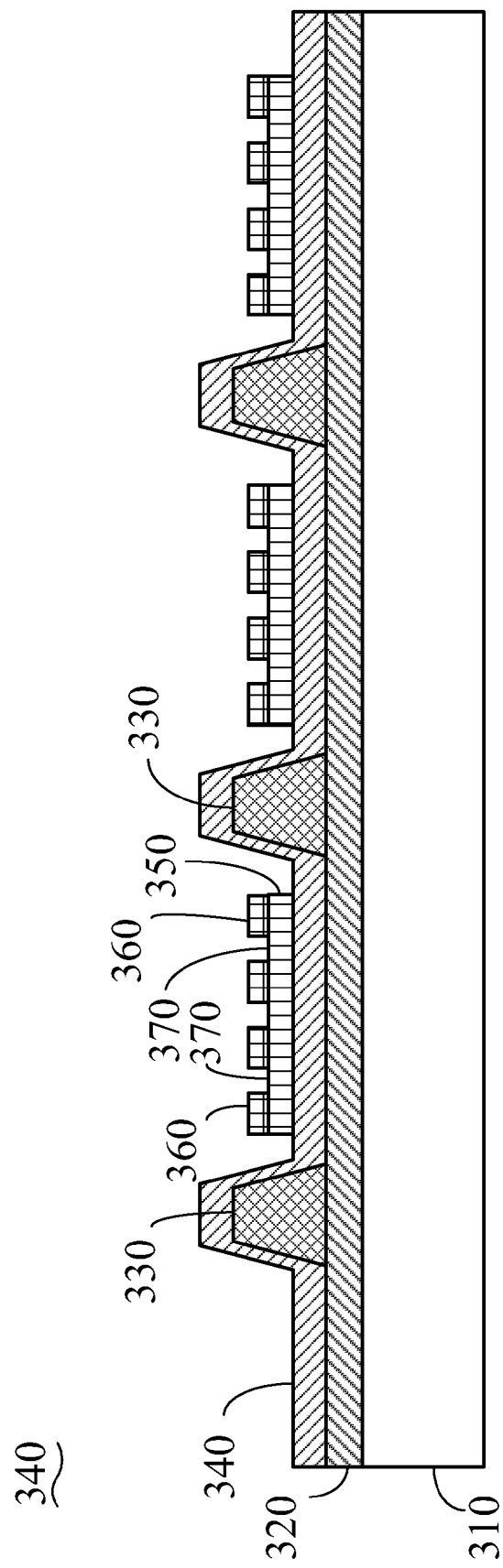
FIG. 3 is a sectional schematic diagram of the liquid crystal substrate in accordance with a first preferred embodiment of the present invention.

Please refer to FIG. 2 and FIG. 3. FIG. 3 is a sectional schematic diagram of the liquid crystal substrate in accordance with a first preferred embodiment of the present invention, and it is a sectional schematic diagram of the liquid crystal substrate in accordance with the first preferred embodiment taken along a B-B line as shown in FIG. 2. The liquid crystal substrate 300 comprises a substrate 310. A first insulation layer 320 is deposited on the substrate 310. Data lines 330 are separately disposed on the first insulation layer 320. A second insulation layer 340 covers the first insulation layer 320 and the data lines 330. A thickness of the second insulation layer 340 is preferably 100 nm to 400 nm. The portions of the second insulation layer 340 between the data lines 330 have first transparent electrode layers 350 deposited thereon. There are second transparent electrode layers 360 on the first transparent electrode layers 350, and the material of the second transparent electrode layer 360 is different from that of the first transparent electrode layer 350. The second transparent electrode layer 360 is partially removed to form a plurality of slits 370. A width of the slit 370 is preferably 0.5 µm to 7.5 µm.

Figure 4:
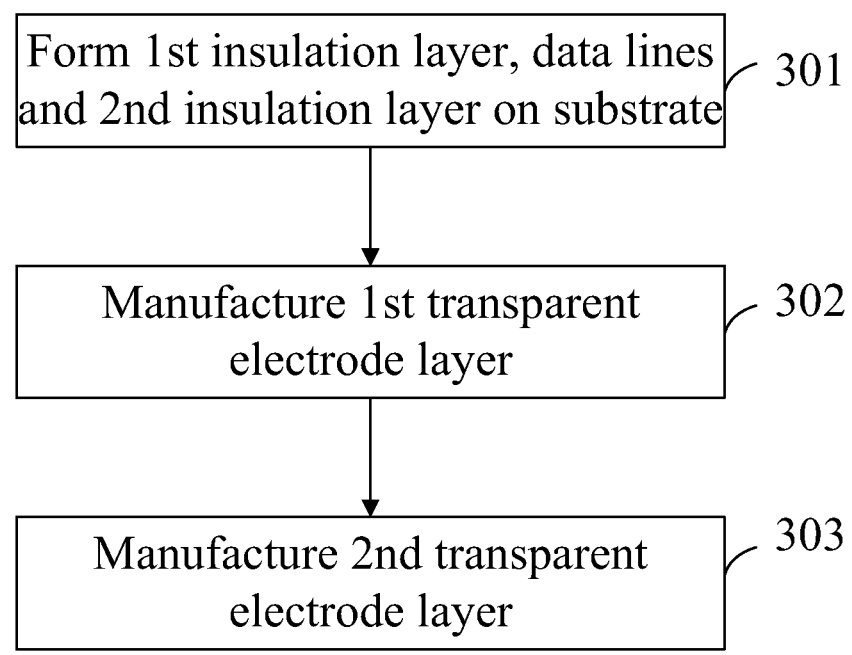
FIG. 4 is a flow chart of a manufacturing method for the liquid crystal substrate shown in FIG. 3.

Please refer to FIG. 3 and FIG. 4 together, the latter is a flow chart of a manufacturing method for the liquid crystal substrate in accordance with a first preferred embodiment of the present invention, the manufacturing method comprises:

Step 301: forming the first insulation layer 320, the data lines 330 and the second insulation layer 340 on the substrate 310 in sequence;

The step 301 particularly comprises:

Step 3011: manufacturing scan lines on a surface of the substrate 310 by metal sputtering, and obtaining the scan lines on the surface of the substrate by exposing, developing, etching processes;

Step 3012: depositing the first insulation layer 320 on the scan lines, the depositing manner can be chemical vapor deposition (CVD) or the like;

Step 3013: manufacturing an amorphous silicon layer and a doped amorphous silicon layer on the first insulation layer 320 by CVD or the like, the doped amorphous silicon layer can be an electron donor such as phosphorane or an electron acceptor such as borane, a thickness of the amorphous silicon layer is preferably 100 nm to 250 nm, the amorphous silicon layer is exposed, developed and etched to form an amorphous portion of the TFT;

Step 3014: depositing a data line layer on the amorphous portion by metal sputtering, the data line layer is exposed, developed, and etched to form the data lines 330, the data lines 330 intersect with the scan lines, and a portion of the data line at the intersection of the data line 330 and the scan line is etched and cut off to form a source (not shown) and a drain (not shown), the source connects with the data line, a portion of the doped amorphous silicon layer under the cut off portion is also be etched and cut off.

Step 3015: depositing the second insulation layer 340 on the data lines 330, the deposition manner can be CVD or the like.

Step 302: manufacturing the first transparent electrode layers 350;

The step 302 particularly comprises:

Step 3021: under a condition that a temperature is greater than 100 centigrade degree, depositing the first transparent electrode layers 350 on the second insulation layer 340, the material of the first transparent electrode layer 350 can be Indium Tin Oxide (ITO), Indium Zinc Oxide (IZO), Indium Tin Zinc Oxide (ITZO), Aluminum doped Zinc Oxide (AZO) and so on, thereby forming the first transparent electrode layer 350 of the polycrystal state on the second insulation layer 340;

Step 3022: forming a contact hole in the second insulation layer 340 by exposing, developing, etching and so on, and etching portions of the first transparent electrode layer 350 other than a region defined by the scan line and the data line 330 intersecting with each other, in order to form the contact hole and etch the first transparent electrode layer 350 at the same time without completely damaging the second insulation layer 340 on the scan line and the data line 330, a gray mask with a proper transmittance is used at positions corresponding to the contact hole and the first transparent electrode layer 350.

Step 303: manufacturing the second transparent electrode layers 360,

The step 302 particularly comprises:

Step 3031: under the room temperature, depositing to obtain the second transparent electrode layer 360 of the amorphous state by sputtering, the material of the second transparent electrode layer 350 can be Indium Tin Oxide (ITO), Indium Zinc Oxide (IZO), Indium Tin Zinc Oxide (ITZO), Aluminum doped Zinc Oxide (AZO) etc. and is different from that of the first transparent electrode layer 350; the second transparent electrode layer 360 is connected with the drain via the contact hole.

Step 3031: forming slits 370 in the second transparent electrode layer 360 by exposing, developing, etching and so on and etching portions of the second transparent electrode layer 360 other than a region defined by the scan line and the data line 330 intersecting with each other, the etchant used in this step is a weak acid, such as oxalic acid, ethanedioic acid or the like, the etchant can only etch the second transparent electrode layer 360 of the amorphous state but cannot etch the first transparent electrode layer 350 of the polycrystal state.

In the present embodiment, after the manufacture of the second transparent electrode layer 360 is finished, the liquid crystal substrate 300 can be processed by annealing under a certain temperature, such as 200-250 centigrade degree, thereby causing the second transparent electrode layer 360 from the amorphous layer to the polycrystal state.

In the present embodiment, the first transparent electrode layer 350 below the second transparent electrode layer 360 and the slits 370 in the liquid crystal substrate 300 can increase an electric field intensity at the slits 370 when a voltage is applied.

Figure 5:
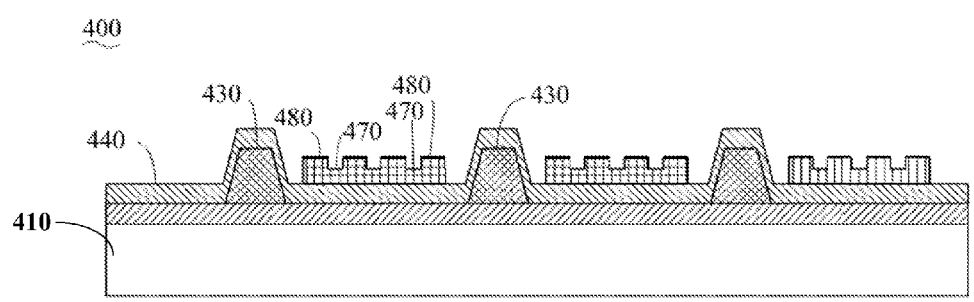
FIG. 5 is a sectional schematic diagram of the liquid crystal substrate in accordance with a second preferred embodiment of the present invention.

Please refer to FIG. 5, which is a sectional schematic diagram of the liquid crystal substrate in accordance with a second preferred embodiment of the present invention, and it is a sectional schematic diagram of the liquid crystal substrate in accordance with the second preferred embodiment taken along the B-B line as shown in FIG. 2. The difference between the present embodiment and the first preferred embodiment is: in the present embodiment, materials and deposition conditions of a first transparent electrode layer 450 and a second transparent electrode layer 460 are the same, thereby forming a transparent electrode layer 480, which is partially etched to form slits 470. Further, the transparent electrode layer 480 is disposed over a substrate 410.

The differences between a manufacturing method for a liquid crystal substrate 400 of the present embodiment and that for the liquid crystal substrate 300 of the first embodiment are:

Step S402: forming a contact hole in a second insulation layer 440;

Step S403: manufacturing a transparent electrode layer 480, this step particularly comprises: depositing the transparent electrode layer 480 on the second insulation layer 440, partially etching the transparent electrode layer 480 by exposing, developing and etching processes to form the slits 470 and etching portions of the transparent electrode layer 480 other than a region defined by the scan line and a data line 430 intersecting with each other.

In the present embodiment, the transparent electrode layer 480 below the slits 470 in the liquid crystal substrate 400 can increase an electric field intensity at the slits 470 when a voltage is applied.

Figure 6:
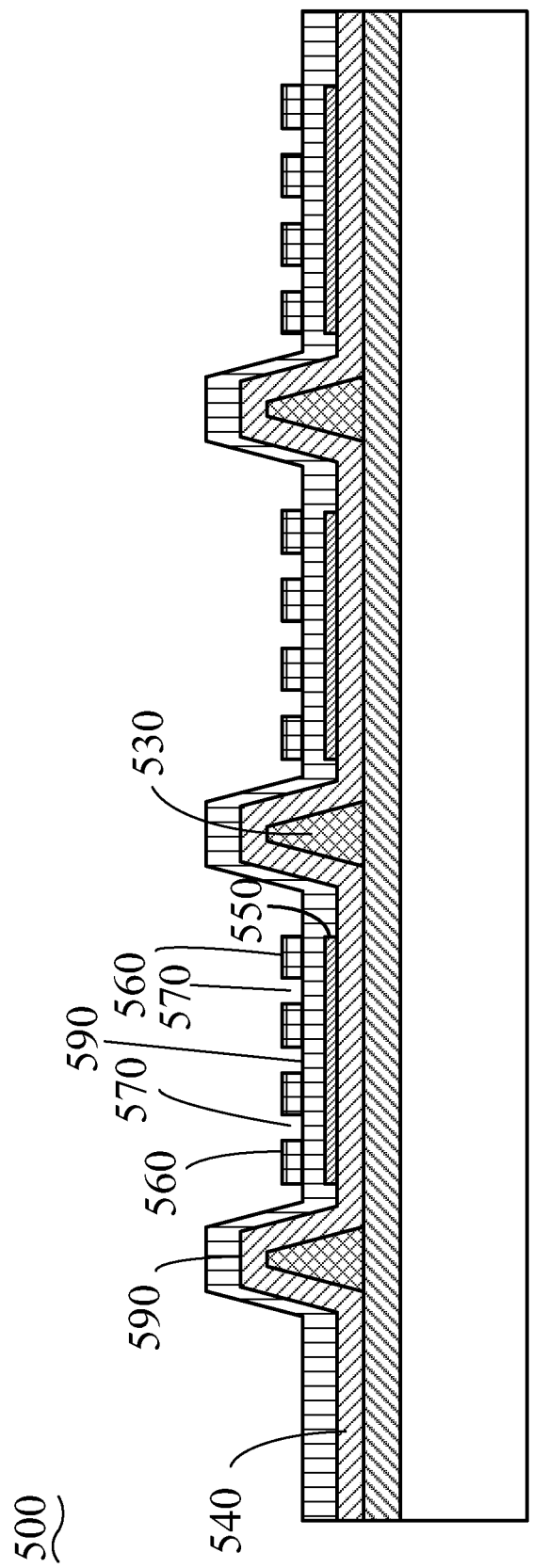
FIG. 6 is a sectional schematic diagram of the liquid crystal substrate in accordance with a third preferred embodiment of the present invention.

Please refer to FIG. 6, which is a sectional schematic diagram of the liquid crystal substrate in accordance with a third preferred embodiment of the present invention, and it is a sectional schematic diagram of the liquid crystal substrate in accordance with the third preferred embodiment taken along the B-B line as shown in FIG. 2. The difference between the present embodiment and the first preferred embodiment is: in the present embodiment, third insulation layer 590 is deposited on a second insulation layer 540 and a first transparent electrode layer 550. A second transparent electrode layer 560 and slits 570 are located above the third insulation layer 590. Materials and deposition conditions of the first transparent electrode layer 550 and the second transparent electrode layer 560 can be the same or different from each other.

Figure 7:
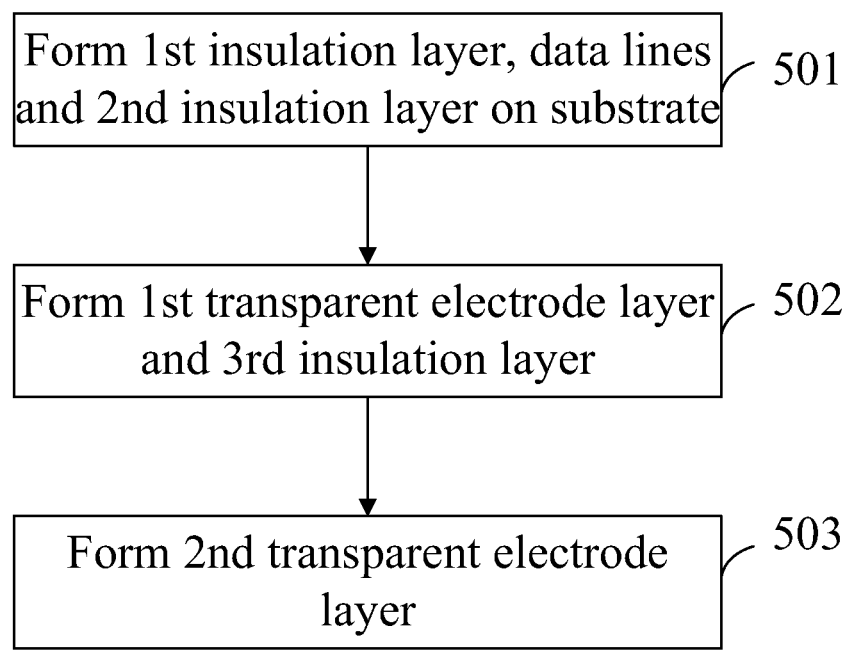
FIG. 7 is a flow chart of a manufacturing method for the liquid crystal substrate shown in FIG. 6.

Please refer to FIG. 6 and FIG. 7 together, the latter is a flow chart of a manufacturing method for the liquid crystal substrate 500 in accordance with a first preferred embodiment of the present invention. The differences between the manufacturing method of the present embodiment and that for the liquid crystal substrate 300 of the first preferred embodiment are:

Step 502: forming the first transparent electrode layer 540 and the third insulation layer 590;

This step particularly comprises:

Step S5021: depositing the first transparent electrode layer 550 on the second insulation layer 540, and then removing portions of the first transparent electrode layer 550 other than a region defined by the scan line and a data line 530 intersecting with each other and retaining a portion of the first transparent electrode layer 550 above a drain (not shown) by exposing, developing and etching processes;

Step S5022: depositing the third insulation layer 590 on the second insulation layer 540 and the first transparent electrode layer 550, and forming a contact hole, which penetrates the second insulation layer 540, the first transparent electrode layer 550 and the third insulation layer 590 by exposing, developing and etching processes;

Step 503: forming the second transparent electrode layer 560;

The step 503 particularly comprises:

Step 5031: depositing the second transparent electrode layer 560 on the third insulation layer 590; Materials and deposition conditions of the second transparent electrode layer 560 and the first transparent electrode layer 550 can be the same or different from each other; The second transparent electrode layer 560 is connected with the drain and the first transparent electrode layer 550 via the contact hole;

Step 5032: forming the slits 570 by exposing, developing and etching processes and etching portions of the second transparent electrode layer 560 other than a region defined by the scan line and a data line 530 intersecting with each other.

In the present embodiment, the first transparent electrode layer 550 is provided under the second transparent electrode layer 560 and the slits 570 in the liquid crystal substrate 500, so an electric field intensity can be increases at the slits 570 when a voltage is applied.

Figure 8:
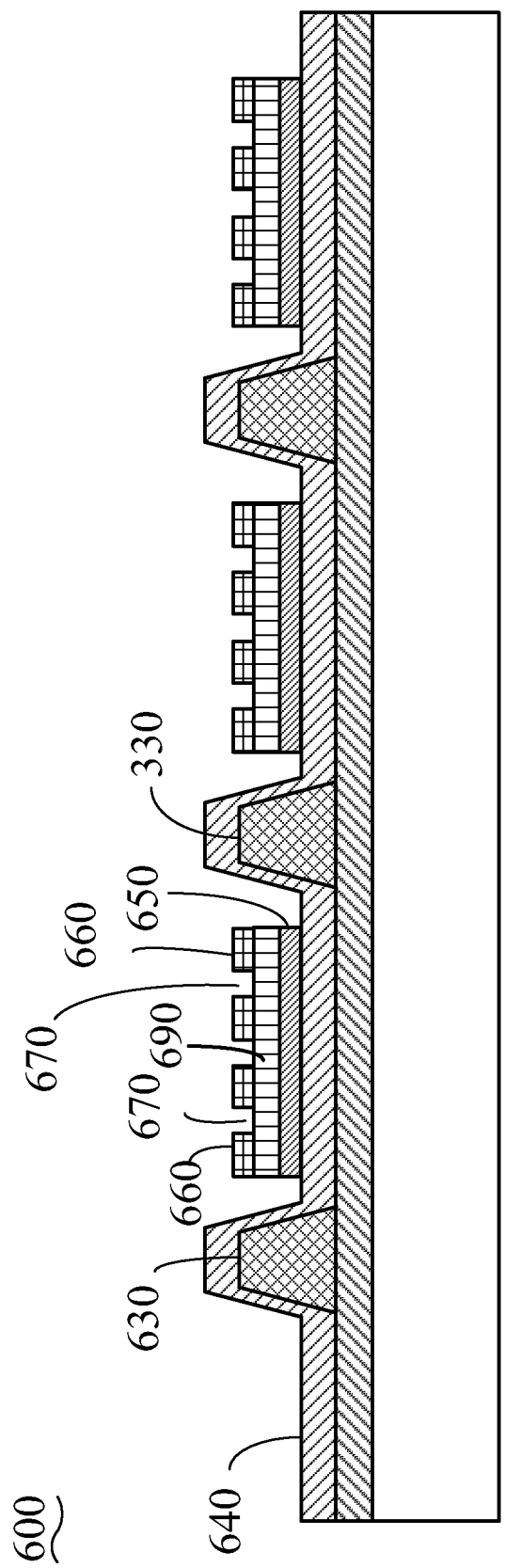
FIG. 8 is a sectional schematic diagram of the liquid crystal substrate in accordance with a fourth preferred embodiment of the present invention.

Please refer to FIG. 8, which is a sectional schematic diagram of the liquid crystal substrate in accordance with a fourth preferred embodiment of the present invention, and it is a sectional schematic diagram of the liquid crystal substrate in accordance with the fourth preferred embodiment taken along the B-B line as shown in FIG. 2. The difference between the present embodiment and the third preferred embodiment is: in the present embodiment, a third insulation layer 690 is only provided between a first transparent electrode layer 650 and a second transparent electrode layer 660.

The differences between the manufacturing method for the liquid crystal substrate 600 of the present embodiment and that for the liquid crystal substrate 500 of the third preferred embodiment are:

Step 6022: depositing the third insulation layer 690 on the first transparent electrode layer 650 and the second insulation layer 640, and then forming a contact hole, which penetrates the second insulation layer 640, the first transparent electrode layer 560 and the third insulation layer 690, by exposing, developing and etching processes, further, etching portions of the third insulation layer 690 other than a portion above the first transparent electrode layer 650.

Figure 9:
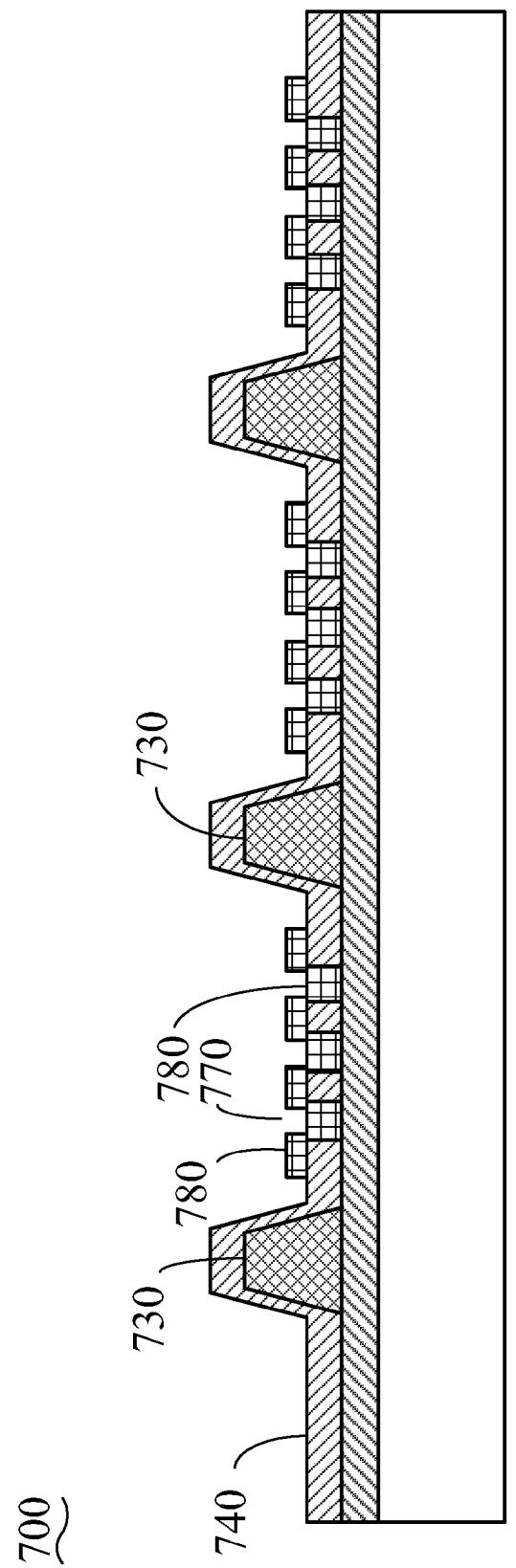
FIG. 9 is a sectional schematic diagram of the liquid crystal substrate in accordance with a fifth preferred embodiment of the present invention.

Please refer to FIG. 9, which is a sectional schematic diagram of the liquid crystal substrate in accordance with a fifth preferred embodiment of the present invention, and it is a sectional schematic diagram of the liquid crystal substrate in accordance with the fifth preferred embodiment taken along the B-B line as shown in FIG. 2. The difference between the present embodiment and the first preferred embodiment is: in the present embodiment, the second insulation layer 740 has a plurality of grooves formed therein, the transparent electrode layer 780 is provided in the grooves and above the second insulation layer 740, the slits 770 are located above the grooves.

The differences between the manufacturing method for the liquid crystal substrate 700 of the present embodiment and that for the liquid crystal substrate 300 of the first preferred embodiment are:

Step 702: manufacturing the second insulation layer 740;

This step particularly comprises: forming a contact hole and the a plurality of grooves in the second insulation layer 740 by exposing, developing and etching processes;

Step 703: manufacturing the transparent electrode layer 780;

This step particularly comprises: depositing the transparent electrode layer 780, forming the slits above the grooves by exposing, developing and etching processes, etching portions of the second insulation layer 760 other than a region defined by the scan line and a data line 730 intersecting with each other.

In the present embodiment, the grooves penetrate the second insulation layer 740, the depth of the grooves can also be set according to the actual condition in other embodiments, of course.

In the present embodiment, the transparent electrode layer 780 is provided under the slits 770 in the liquid crystal substrate 700, so an electric field intensity can be increases at the slits 770 when a voltage is applied.

In the above first to fifth embodiments, the liquid crystal substrate only comprises the TFT, data lines and scan lines, however, in other embodiments, the liquid crystal substrate may also comprise a color filter layer, that is, the liquid crystal substrate is a color-filter on array (COA) substrate.

In the embodiments of the present invention, the electric field intensity at the slits can be increased by the transparent electrode layer provided below the slits when a voltage is applied.

The present invention also provides a liquid crystal display panel, which comprises any one of the above liquid crystal substrates, a second substrate and liquid crystal molecules provided between the liquid crystal substrate and the second substrate. The liquid crystal substrate has the same structure as described above, and therefore the descriptions are omitted here.

In the liquid crystal substrate and the manufacturing method for the same in accordance with the present invention, the transparent electrode layer is provided under the slits of the transparent electrode layer so as to increase the electric field intensity at the slits, and thereby increasing the luminousness of the LCD panel.

To sum up, the present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A liquid crystal panel applied in a vertical alignment display mode, characterized in that, the liquid crystal panel comprises a transparent electrode layer and a substrate, the transparent electrode layer has slits formed therein, and the transparent electrode layer is also provided under the slits, wherein the transparent electrode layer is disposed over the substrate without any insulating layer disposed in the transparent electrode layer;

wherein the transparent electrode layer comprises a first transparent electrode layer and a second transparent electrode layer, the second transparent electrode layer has the slits formed therein, and the first transparent electrode layer is provided under the slits, the second transparent electrode layer is directly provided on a surface of the first transparent electrode layer; and wherein a material of the second transparent electrode layer is different from that of the first transparent electrode layer.

2. The liquid crystal panel according to claim 1, characterized in that, the liquid crystal panel comprises a first insulation layer, which has a plurality of grooves formed therein, the transparent electrode layer is provided in the grooves and on the first insulation layer, the slits are provided above the grooves.

3. The liquid crystal panel according to claim 2, characterized in that, the grooves penetrate the first insulation layer.

4. The liquid crystal panel according to claim 1, characterized in that, the liquid crystal panel further comprises a plurality of data lines and drains, the transparent electrode layer is connected with the drain via a contact hole.

5. The liquid crystal panel according to claim 1, characterized in that, a width of each of the slits is 0.5 μm to 7.5 μm.

6. A manufacturing method for a liquid crystal panel applied in a vertical alignment display mode, characterized in that, comprising steps of:

forming a transparent electrode layer on a substrate;

forming slits in the transparent electrode layer and making the transparent electrode layer also exist below the slits;

wherein the step A particularly comprises: forming a first transparent electrode layer and a second transparent electrode layer on the substrate without any insulating layer disposed in the first transparent electrode layer and the second transparent electrode layer; and the step B particularly comprises: forming the slits in the second transparent electrode layer; and wherein a material of the second transparent electrode layer is different from that of the first transparent electrode layer.

7. The manufacturing method for the liquid crystal panel according to claim 6, characterized in that, in the step A, the first transparent electrode layer is formed under a condition that a temperature is greater than 100 centigrade degree so as to appear in a polycrystal state.

8. The manufacturing method for the liquid crystal panel according to claim 6, characterized in that, in the step A, the second transparent electrode layer is formed under a room temperature so as to appear in an amorphous state.

9. The manufacturing method for the liquid crystal panel according to claim 8, characterized in that, after the step B, further comprising a step of: executing an annealing process to the liquid crystal panel to convert the second transparent electrode layer from the amorphous state to the polycrystal state.

10. The manufacturing method for the liquid crystal panel according to claim 9, characterized in that, in the step B, the slits are formed by etching the second transparent electrode layer with an etchant, the etchant is a weak acid.

11. The manufacturing method for the liquid crystal panel according to claim 6, characterized in that, a width of each of the slits is 0.5 μm to 7.5 μm.

* * * * *